July 6, 1926.

A. F. CARLSON 1,591,657

DRIVING AND STOPPING MECHANISM FOR SEWING MACHINES AND THE LIKE

Filed Feb. 2, 1925   3 Sheets-Sheet 1

Inventor
Axel F. Carlson
by Heard Smith & Tennant.
Attys.

July 6, 1926.  
A. F. CARLSON  
1,591,657  
DRIVING AND STOPPING MECHANISM FOR SEWING MACHINES AND THE LIKE  
Filed Feb. 2, 1925   3 Sheets-Sheet 2

Inventor.  
Axel F. Carlson  
by Heard Smith & Tennant  
Attys.

July 6, 1926. 1,591,657
A. F. CARLSON
DRIVING AND STOPPING MECHANISM FOR SEWING MACHINES AND THE LIKE
Filed Feb. 2, 1925  3 Sheets-Sheet 3
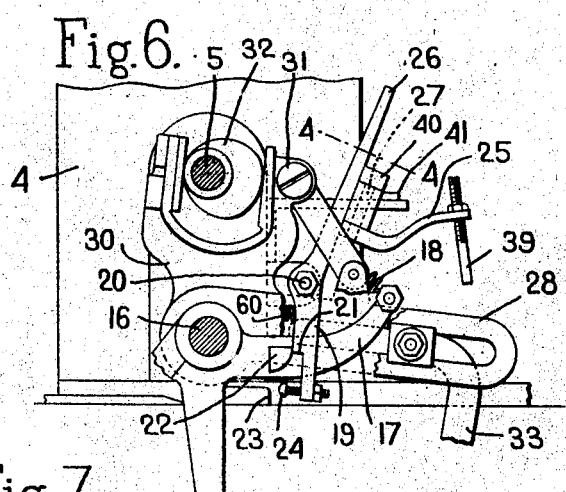
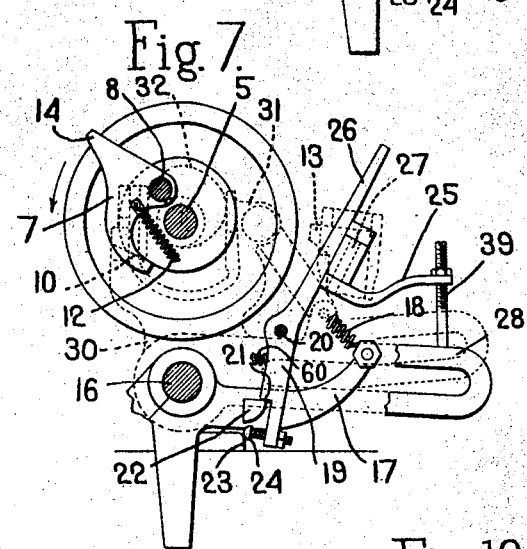
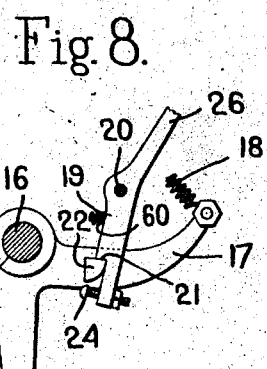
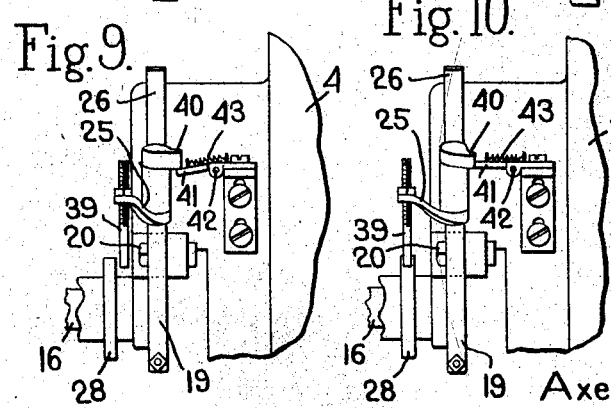
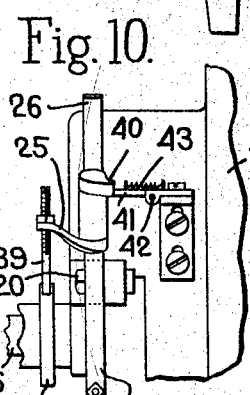
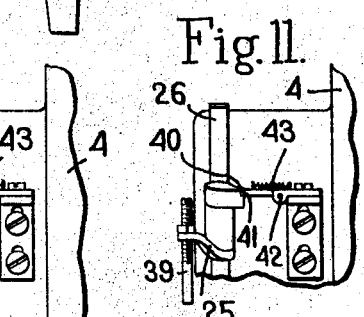
Inventor.
Axel F. Carlson
by Heard Smith & Tennant
Attys.

Patented July 6, 1926.

1,591,657

UNITED STATES PATENT OFFICE.

AXEL FOLKE CARLSON, OF CAMBRIDGE, MASSACHUSETTS, ASSIGNOR TO THE REECE BUTTON HOLE MACHINE COMPANY, OF BOSTON, MASSACHUSETTS, A CORPORATION OF MAINE.

DRIVING AND STOPPING MECHANISM FOR SEWING MACHINES AND THE LIKE.

Application filed February 2, 1925. Serial No. 6,216.

This invention relates to driving and stopping mechanism and particularly to a driving and stopping mechanism of the type shown in United States Patents No. 367,063, July 26th, 1887, and No. 713,764, November 18th, 1902.

The driving and stopping mechanism in these patents comprises a pivotally-mounted clutch dog which is rotative with the shaft to be driven and a driving pulley having a shoulder with which the clutch dog has operative engagement when the clutch is in operation. The clutch dog is urged toward its operative position by a spring and it is disengaged from the shoulder by means of a combined disengaging member and stop member which is adapted to engage a tail extending from the clutch dog. When the clutch is operative this disengaging member is held out of the path of movement of the tail of the dog by a suitable latch and when the clutch is to be disengaged the latch is released and the disengaging member is swung into its operative position in the path of movement of the tail of the clutch dog by means of a spring so that when said tail engages the clutch-releasing member the dog will be turned and disengaged from the shoulder of the driving pulley thus uncoupling the pulley from the shaft.

The clutch is shown in the above-mentioned patents as applied to a buttonhole sewing machine which includes stitch-forming mechanism and work-holding means having a movement relative to each other, and the latch which holds the disengaging member in its inoperative position is released at the proper time in the cycle of operations by such relative movement. This relative movement is comparatively slow and during the slow relative movement the latch is gradually given its releasing movement and it may finally be released to allow the disengaging member to move into the path of the clutch dog when the clutch dog is at any point in its rotative movement. In actual practice it sometimes happens that this release will occur just as the tail of the clutch dog is passing the clutch-releasing member and as a result during the forward movement of the clutch-releasing member it will strike the tail of the clutch dog just as the latter is passing said releasing member so that said tail will wipe by the clutch-releasing member thus causing the latter to rebound.

It is one of the objects of my present invention to provide improvements in this form of clutch and stop mechanism which will eliminate any possibility of such a rebound and will always ensure the proper disconnection of the clutch and stopping of the driving shaft when the latch is released. I accomplish this herein by providing means actuated by the driven shaft to release the latch at a predetermined point in the rotation of the shaft thereby obviating any possibility that the release will occur just at the time that the tail of the dog is passing the releasing member.

In the construction herein shown the releasing of the latch is initiated by the relative movement between the stitch-forming mechanism and work-holding means as in the above-mentioned patent but the final release is accomplished by means actuated by said shaft and always when said shaft is in a predetermined position. This prevents any possibility of a so-called "fly over" of the clutch and ensures that the clutch will be disengaged and the shaft brought to rest always at the proper point in the cycle of operations.

In order to give an understanding of the invention I have illustrated in the drawings a selected embodiment thereof which will now be described after which the novel features will be pointed out in the appended claims.

Fig. 6 is a section on substantially the line 6—6, Fig. 2 showing the parts in the position they assume when the machine has been brought to rest;

Fig. 7 is a similar view showing the operation of the latch-releasing mechanism;

Fig. 8 is a fragmentary view showing the latch in its fully engaged position;

Figs. 9, 10 and 11 are fragmentary views of the latch and latch-releasing member showing them in different positions.

Figure 1:
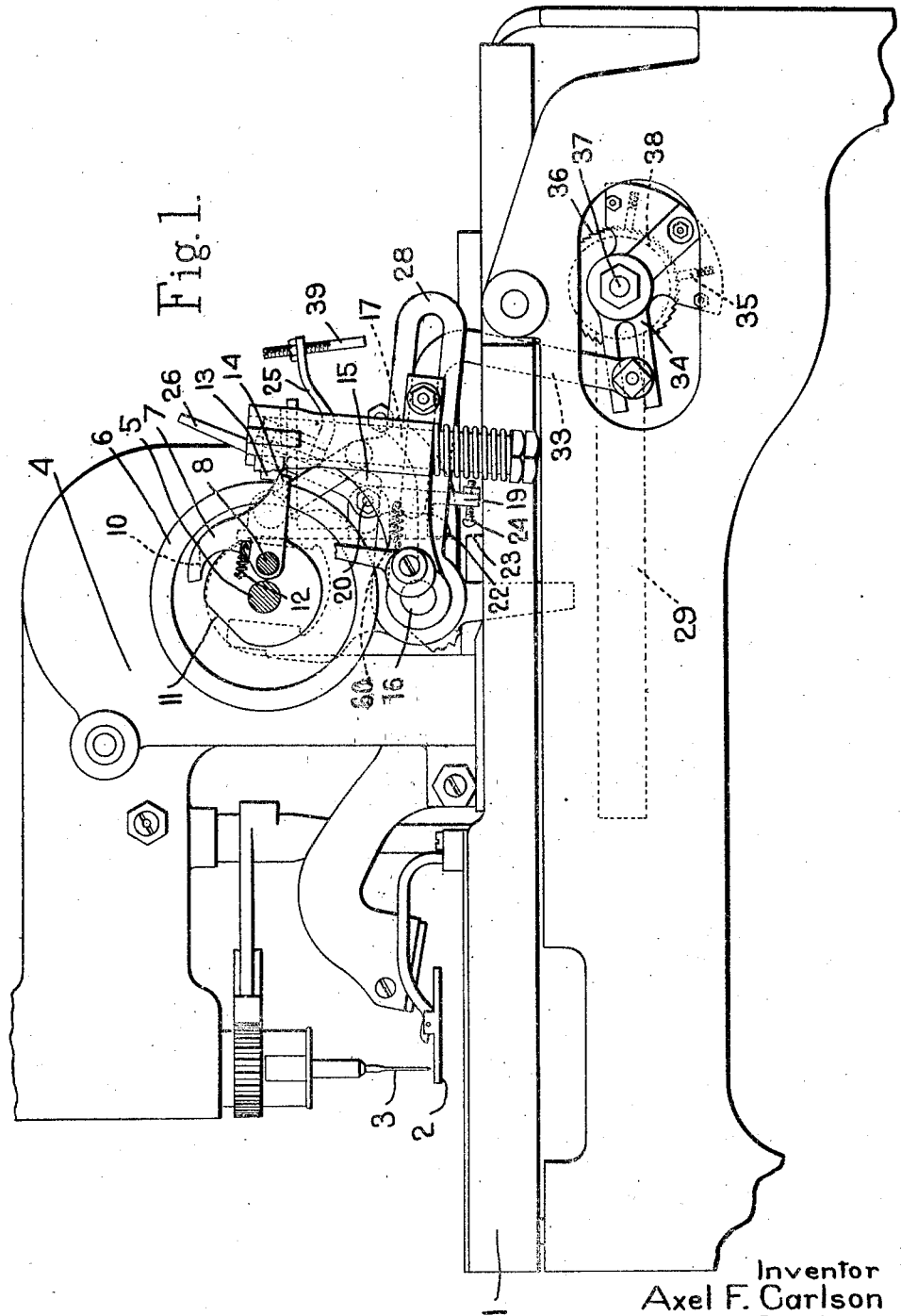
Fig. 1 is a side view of a buttonhole sewing machine having my improvements applied thereto with the driving shaft shown in section on the line 1—1, Fig. 2.
Figure 2:
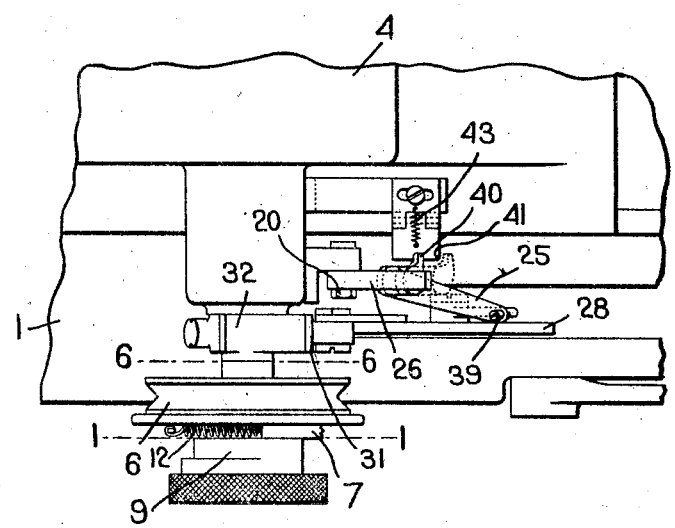
Fig. 2 is a fragmentary top plan view showing the driving clutch and stop mechanism.

As stated above I have herein illustrated the invention as it may be applied to a buttonhole sewing machine such as illustrated in above-mentioned Patent No. 713,764. In said sewing machine 1 indicates the bed frame carrying the work-holding means in the form of work clamps 2. The stitch-forming mechanism which includes a needle 3 operating above the work and also under thread handling mechanism operating beneath the work, is carried by a head 4 that is herein shown as movable back and forth on the bed 1, this movement providing the necessary relative movement between the stitch-forming mechanism and work-holding means to accomplish the stitching along the edges of the buttonhole.

The stitch-forming mechanism is operated from a driving shaft 5 all as usual in machines of this sort and the drive shaft in turn is driven from a driving pulley 6 which is loosely mounted thereon.

The clutch for connecting the driving pulley to the drive shaft is similar to that shown in the above-mentioned patent. It comprises a clutch dog 7 pivotally mounted at 8 to a hub 9 that is fast on the shaft 5, said dog having a nose 10 adapted to engage a shoulder 11 formed on the driving pulley 6. The clutch dog is acted upon by a spring 12 which tends normally to throw it into operative position in which the nose 10 engages the shoulder 11 as shown in Fig. 7, and when in this position the rotation of the pulley will operate through the shoulder 11 and nose 10 to give rotation to the dog and the shaft 5.

The clutch is released at proper times by means of a clutch-releasing member 13 which is adapted to engage the tail 14 of the clutch dog as shown in Fig. 1. This clutch-releasing member 13 is movable toward and from the shaft 6 and when in its retracted position it is outside the path of movement of the tail 14 which is the position of the parts when the clutch is engaged. When the clutch is to be disengaged the member 13 is moved toward the left into the position shown in Fig. 1 in which position it is in the path of movement of the tail 14 so that the latter will engage the member 13 as the shaft rotates thereby turning the clutch dog about its pivot 8 and releasing it from the shoulder 11.

The clutch-disengaging member 13 is carried by a rocking member 15 which is mounted on a shaft 16. Said rocking member has rigid therewith an arm 17 which is acted on by a spring 18 that tends normally to swing the rocking member 15 to the left into the position shown in Fig. 1.

The clutch-releasing member 13 is held in its inoperative position while the clutch is engaged by means of latch 19 pivoted at 20 and having a shoulder 21 adapted to engage a projection 22 which is carried by the arm 17.

So long as the latch 19 engages the projection 22 as shown in Fig. 8 the clutch-disengaging member 13 will be held out of the path of movement of the tail 14 of the clutch dog and the clutch will therefore, remain operative. When, however, the latch 19 is released from the projection 22 then the spring 18 swings the clutch-releasing member 13 into the path of movement of the clutch dog so that upon the next rotation of the shaft the tail of the clutch dog will engage the member 13 thereby disengaging the clutch.

In the above-mentioned patents this releasing of the latch is accomplished by the relative movement between the work-holding means and stitch-forming mechanism, which, in the device herein shown, would be by the movement of the head 4, such releasing occurring just as the stitching on the buttonhole has been completed.

The bed frame 1 is provided with an abutment 23 which is situated to engage a screw 24 adjustably mounted in the lower end of the latch. It will be remembered that the latch is mounted on the head 4 and it will be understood that the head 4 is moving to the left Fig. 1 at the time that the stitching on the buttonhole is completed. Just as the last few stitches on the buttonhole are being formed the abutment 23 engages the screw 24 and during the formation of the last stitches continued movement of the head toward the right will cause the latch to be turned anti-clockwise in Figs. 7 and 8.

In the above-mentioned patents the entire movement of the latch necessary to release it from the projection 22 is accomplished by this forward movement of the head but as stated above a disadvantage of this construction is that the final release of the latch may occur when the clutch dog is in any angular position.

In my present invention I have provided a construction whereby the initial releasing movement of the latch is accomplished by the abutment 23 but the final release is accomplished by means actuated from the shaft and which releases the latch when the clutch dog is in a predetermined angular position.

This is herein accomplished by providing the latch with a latch-releasing member which, when the latch is partially released, is moved into position to be engaged by a member that is constantly reciprocated in timed relation with the driving shaft, the engagement of said reciprocating member with the latch-releasing member completing the release of the latch at a definite point in the rotation of the shaft. This latch-releasing member is shown as an arm 25 which extends rearwardly from the upper end 26 of the latch and which is pivotally mounted thereto as shown at 27. The constantly-reciprocating member which co-operates with the latch-releasing member 25 is herein shown as the slotted arm 28 which forms part of the feed mechanism for actuating the main cam 29 by which the operation of the machine is controlled. This arm 29 is part of an elbow lever 30 that is mounted for oscillation on the shaft 16, the other arm 31 of said lever being forked and embracing a cam 32 which is fast on the shaft 5. The cam 32 will thus oscillate the elbow lever 30 in timed relation with the rotation of the shaft 5 and the slotted arm 28 of said lever thus has an up and down movement. This arm 28 is connected by a link 33 to a pawl carrier 34 which carries a feed pawl 35, the latter engaging the ratchet wheel 36. This ratchet wheel 36 is fast on a shaft 37 which is provided with a worm 38 that meshes with worm teeth on the periphery of the cam 29 all as shown in Patent No. 1,515,754, November 18th, 1924. The oscillation of the elbow lever 30 thus feeds the cam 29 intermittently.

Figure 4:
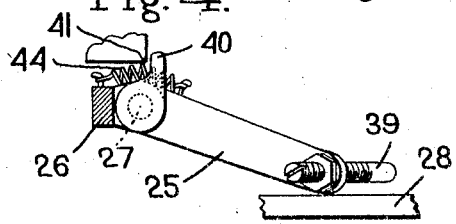
Fig. 4 is an enlarged section on substantially the line 4—4, Fig. 6 showing the latch-releasing member in inoperative position.

The clutch-releasing arm 25 is shown as carrying at its end an adjustable screw 39. When the machine is running the clutch-releasing member 25 assumes a position in which the screw 39 is out of line with the vertically-reciprocating arm 28 as shown in Figs. 3 and 4 and hence said clutch-releasing member is not affected by the vertical reciprocation of the arm 28 from the full to the dotted line position.

Figure 5:
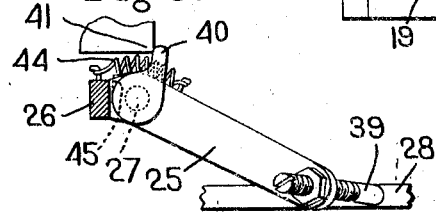
Fig. 5 is a view similar to Fig 4 but showing the latch-releasing member in operative position.

When the latch is partially released as shown in Fig. 7 then the clutch-disengaging arm 25 is swung into the position shown in Figs. 5 and 10 in which the screw 39 is in line with the arm 28 and thereafter on the next upward movement of the arm 28 it engages the screw 39 and gives the latch 19 its final releasing movement, thus allowing the spring 18 to throw the clutch-disengaging member 13 into its operative position.

It will be remembered that the arm 28 is reciprocating in timed relation with the rotation of the shaft 5 and the parts are so arranged that the arm 28 is in its lowest position when the clutch dog is in substantially the position shown in Fig. 1 and the latch 19 will be finally released from the projection 22 when the clutch dog is in about the position shown in Fig. 7. I propose to so adjust the parts that when this final release occurs the clutch dog will have about a half revolution to make before the tail thereof engages the clutch-releasing member 13 and with this arrangement there is always a sufficient interval between the release of the latch and the time when the tail of the clutch dog reaches a position to engage the clutch-releasing member 13 to ensure that said clutch-releasing member will be fully in position.

Figure 3:
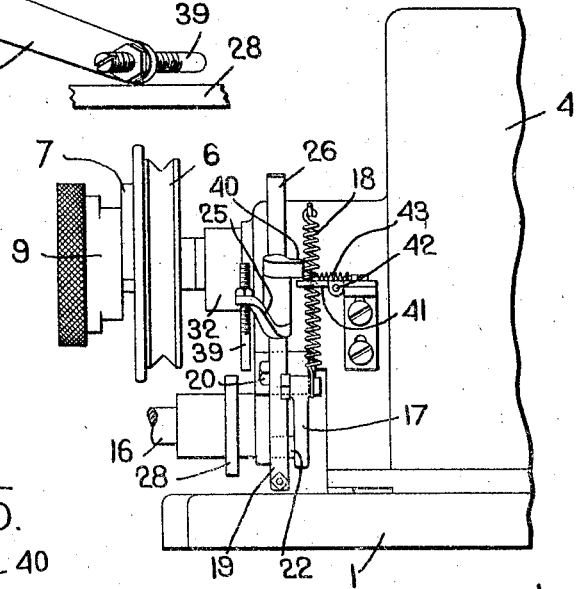
Fig. 3 is a rear view thereof.

The means for shifting the clutch-releasing member 25 from the position shown in Fig. 3 to that shown in Fig. 10 comprises a nose 40 rigid with the arm 25 and adapted to engage a cam member 41 carried by the head 4.

When the latch 19 is fully engaged with the projection 22 as shown in Fig. 8, which is the condition during the stitching on the buttonhole, the nose 40 is in the rear of the cam 41 but when the latch is engaged by the abutment 23 and has its initial releasing movement the consequent swinging movement of the latch brings the nose 40 into engagement with the cam 41 as shown in Fig. 5 which results in swinging the member 25 laterally to bring the screw 39 in the path of movement of the reciprocating arm 28 as shown in Figs. 5 and 10. As soon as the latch-releasing member is brought into the position shown in Figs. 5 and 10 then on the next upward movement of the arm 28 it will engage the screw 39 and complete the release of the latch, such complete release always occurring when the shaft 5 is in a predetermined position as above described.

In order to permit the latch to be reset I propose to pivotally mount the cam plate 41 as shown at 42 and to provide a spring 43 which yieldingly holds the cam plate in its operative position. When the latch has been completely released the consequent swinging movement of the latch carries the nose above the cam plate. When the machine is to be started from a state of rest the rocking member 15 is swung backwardly to withdraw the clutch-releasing member 13 from engagement with the tail of the clutch dog and to carry the projection 22 below the shoulder 21 of the latch 19 at which time the latch is carried into its operative position shown in Fig. 8 by a spring 60. During this swinging movement of the latch into operative position the nose 40 engages the cam plate 41 and swings it downwardly as shown in Fig. 9 thus wiping by the cam plate and when the latch is in its final operative position the nose has been carried back of the cam plate as shown in Fig. 4 and the latter is returned to its operative position by the spring 43. When, therefore, the latch is given its initial releasing movement by the abutment 23 as above described the consequent swinging movement of the latch will bring the nose 40 against the cam plate 41 thus swinging the latch-releasing member into its operative position shown in Fig. 5.

The latch-releasing member is acted on by a spring 44 which tends normally to hold it in its inoperative position. Said member is also formed with an abutment face 45 which engages the rear face of the upper end 26 of the latch when the latch-releasing member is in its inoperative position, said face 45 forming a stop to limit the spring-impelled movement of the latch-releasing member.

I claim.

1. In a sewing machine having stitch-forming mechanism and work-holding means movable relative to each other, the combination with said stitch-forming mechanism and work-holding means, of a clutch for operating the stitch-forming mechanism, a clutch-disengaging member, a latch to hold said member inoperative, means to move said member into clutch-disengaging position when released by the latch, means to initiate the releasing movement of the latch by the relative movement between the stitch-forming mechanism and work-holding means, and other means to complete said releasing movement of the latch.

2. In a sewing machine having stitch-forming mechanism and work-holding means movable relative to each other, the combination with said stitch-forming mechanism and work-holding means, of a shaft from which the stitch-forming mechanism is operated, a clutch for driving said shaft, a clutch-disengaging member, a latch to hold said clutch-disengaging member inoperative, means to move said member into clutch-disengaging position when released by the latch, means to initiate the latch-releasing movement by the relative movement between the stitch-forming mechanism and work-holding means, and means actuated by said shaft to complete said releasing movement of the latch.

3. In a sewing machine, the combination with work-holding means and stitch-forming mechanism movable relative to each other, of a shaft for driving the stitch-forming mechanism, a clutch for operating the shaft, a clutch-releasing member, a latch to hold the clutch-releasing member inoperative, means to move said member into clutch-disengaging position when released by the latch, a reciprocating member actuated by said shaft, means to initiate the clutch-releasing movement of said latch by said relative movement, and means to complete said clutch-releasing movement of the latch by the reciprocating member.

4. In a sewing machine, the combination with work-holding means and stitch-forming mechanism movable relative to each other, of a shaft for operating the stitch-forming mechanism, a clutch through which the shaft is driven, a clutch-releasing member, a latch normally holding said releasing member in operative position, means to initiate the releasing movement of the latch by said relative movement, a vibrating member constantly actuated from said shaft when it is rotating, and means actuated by said relative movement to cause the latch to be finally released by said vibrating member.

5. In a sewing machine, the combination with stitch-forming mechanism and work-holding means movable relative to each other, a clutch by which the stitch-forming mechanism is operative, a clutch-releasing member, a latch to hold said clutch-releasing member inoperative, a latch-releasing member, means to initiate the latch-releasing movement by said relative movement, a vibrating member actuated constantly by said shaft when it is rotating, and means to cause the vibrating member to complete the clutch-releasing movement.

6. In a sewing machine, the combination with stitch-forming mechanism and work-holding means movable relative to each other, of a clutch for operating the stitch-forming mechanism, a clutch-releasing member, a latch for holding said clutch-releasing member inoperative, a constantly vibrating member actuated from said clutch, a latch-releasing member normally in inoperative position with respect to said vibrating member, and means actuated by said relative movement to bring the latch-releasing member into operative position relative to the vibrating member whereby the latter effects a release of the latch.

7. In a sewing machine, the combination with work-holding means and stitch-forming mechanism movable relative to each other, of a shaft for operating the stitch-forming mechanism, a clutch for driving the shaft, a clutch-disengaging member, a latch to hold said member inoperative, means to move said member into clutch-disengaging position when released by the latch, means to initiate the releasing movement of the latch by the relative movement of the stitch-forming mechanism and work-holding means, and other means to complete the releasing movement of the latch at a predetermined point in the rotation of the shaft.

In testimony whereof, I have signed my name to this specification.

AXEL F. CARLSON.